(12) United States Patent
Chen et al.

(10) Patent No.: US 8,037,019 B2
(45) Date of Patent: Oct. 11, 2011

(54) PRODUCT NORMALIZATION

(75) Inventors: Xiang Chen, El Sobrante, CA (US); Dmitri Pavlovski, San Francisco, CA (US); Arkady Borkovsky, San Francisco, CA (US); Richard Collins, Sunnyvale, CA (US)

(73) Assignee: Invenda Corporation, Bethesda, MD (US)

( * ) Notice: Subject to any disclaimer, the term of this patent is extended or adjusted under 35 U.S.C. 154(b) by 292 days.

(21) Appl. No.: 12/463,781

(22) Filed: May 11, 2009

(65) Prior Publication Data

US 2009/0222425 A1 Sep. 3, 2009

Related U.S. Application Data

(63) Continuation of application No. 11/019,130, filed on Dec. 22, 2004, now Pat. No. 7,542,964, which is a continuation of application No. 09/925,218, filed on Aug. 8, 2001, now Pat. No. 6,853,996, which is a continuation-in-part of application No. 09/653,040, filed on Sep. 1, 2000, now Pat. No. 6,556,991.

(51) Int. Cl.
*G06F 17/30* (2006.01)

(52) U.S. Cl. ...................................... 707/609

(58) Field of Classification Search ......................... None
See application file for complete search history.

(56) References Cited

U.S. PATENT DOCUMENTS

| | | | |
|---|---|---|---|
| 5,333,317 A | 7/1994 | Dann | 395/600 |
| 5,781,772 A | 7/1998 | Wilkinson, III et al. | 395/600 |
| 5,826,263 A | 10/1998 | Nakabayashi et al. | 707/7 |
| 5,832,480 A | 11/1998 | Byrd, Jr. et al. | 707/5 |
| 5,845,289 A | 12/1998 | Baumeister et al. | 707/103 |
| 5,960,430 A | 9/1999 | Haimowitz et al. | 707/6 |
| 6,115,690 A | 9/2000 | Wong | 705/7 |
| 6,243,709 B1 | 6/2001 | Tung | 707/103 |
| 6,334,131 B2 | 12/2001 | Chakrabarti et al. | 707/10 |
| 6,546,381 B1 | 4/2003 | Subramanian et al. | 707/2 |
| 6,556,991 B1 | 4/2003 | Borkovsky | 707/737 |
| 6,853,996 B1 | 2/2005 | Chen et al. | 707/10 |
| 7,542,964 B2 | 6/2009 | Chen et al. | 1/1 |
| 2008/0080743 A1* | 4/2008 | Schneiderman et al. | 382/118 |
| 2009/0222441 A1* | 9/2009 | Broder et al. | 707/5 |

(Continued)

FOREIGN PATENT DOCUMENTS

EP 1 011 056 6/2000

(Continued)

OTHER PUBLICATIONS

Carrick et al., "Automatic Association of News Items", *Information Processing & Management*, vol. 33, No. 5, Sep. 1, 1997, pp. 615-632.

(Continued)

*Primary Examiner* — Diane Mizrahi
(74) *Attorney, Agent, or Firm* — Pillsbury Winthrop Shaw Pittman LLP

(57) ABSTRACT

A computer-implemented approach for organizing input listings from various sources of input listings. Input listings are organized by mapping the input listings to consolidated listing that correspond to the input listings. The mapping of the input listings are based on various techniques such as a Stock Keeping Unit item-listing-to-consolidated-listing matching technique, a name/title item-listing-to-consolidated-listing matching technique, and a model item-listing-to-consolidated-listing matching technique.

24 Claims, 9 Drawing Sheets

U.S. PATENT DOCUMENTS

2010/0094910 A1* 4/2010 Bayliss .................. 707/800

FOREIGN PATENT DOCUMENTS

| JP | 2000-172722 | 6/2000 |
|---|---|---|
| WO | WO 02/21309 | 3/2002 |

OTHER PUBLICATIONS

Wacholder et al., "Disambiguation of Proper Names in Text", *Proceedings of the Conference on Applied Natural Language Processing*, Association Computer Linguistics, Morristown, NJ, Mar. 1997, XP002922126, pp. 202-208.

Thompson et al., "Name Searching and Information Retrieval", Online Publication, Jun. 12, 1997, XP002415993, Retrieved from the Internet: URL:http://arxiv.org/abs/cmp-lg/9716147> [retrieved on Jan. 22, 2006], 10 pages.

Paice, Chris D., "Another Stemmer", *Sigir Forum*, vol. 24, No. 3, 1990, XP 000900029, pp. 56-61.

* cited by examiner

PRODUCT NORMALIZATION

RELATED APPLICATIONS

This application is a continuation of U.S. patent application Ser. No. 11/019,130, filed Dec. 22, 2004, entitled "Product Normalization" (now U.S. Pat. No. 7,542,964, issued Jun. 2, 2009), which is a continuation of U.S. patent application Ser. No. 09/925,218, filed Aug. 8, 2001, entitled "Product Normalization" (now U.S. Pat. No. 6,853,996, issued Feb. 8, 2005), which is a continuation-in-part of U.S. patent application Ser. No. 09/653,040, filed on Sep. 1, 2000, entitled "Item Name Normalization" (now U.S. Pat. No. 6,556,991, issued Apr. 29, 2003), the contents of which are hereby incorporated herein by reference in their entirety.

FIELD OF THE INVENTION

The present invention relates to data processing, and more specifically, to a normalization approach for processing data.

BACKGROUND OF THE INVENTION

Information is typically retrieved from an information system by submitting a search query to the information system, where the search query specifies a set of search criteria. The information system processes the search query against a set of searchable items and provides search results to a user.

For example, in the context of online shopping over the Internet, a user may submit a word-based search query that specifies the product item that the user wishes to purchase. For example, a user that is shopping for a DVD player may submit a word-based search query that specifies, "SONY DVD Player".

In the context of online shopping, the searchable items against which the search query is processed may include item listings from a variety of merchants. Thus, an online shopping information system may compare the search query "SONY DVD Player" against item listings from a variety of merchants, and generate the output shown in TABLE 1 as the search results.

TABLE 1

| No. | Name | Brand | Price | Merchant |
|---|---|---|---|---|
| 1 | Sony DVPS-550D DVD Player | Sony | 399 | Camera Sphere |
| 2 | Sony DVP-S560D DVD Player | Sony | 359 | Camera Sphere |
| 3 | Sony DVP-FX1 DVD Player | Sony | 1655 | Proactive Electronics |
| 4 | Sony DVP-S360D DVD Player | N/A | 239 | Supremevideo |
| 5 | Sony DVPC-650D DVD Player | N/A | 469 | Supremevideo |
| ... | | | | |
| 26 | Sony DVP-S550D DVD Player | N/A | 399 | WolfeCamera |
| 27 | Sony DVP-C650D DVD Player | Sony | 449 | Camera Sphere |
| 28 | Sony DVP-S325D DVD Player | N/A | 539 | Supremevideo |
| 29 | Sony DVP-S550D DVD Player | N/A | 352 | Supremevideo |
| 30 | Sony DVP-S530D DVD Player | N/A | 279 | Supremevideo |

As used herein, the term "search results" refers to data that indicates the item listings that satisfy a search query. One problem with using word-based search queries to retrieve information is that the information retrieved is often too numerous and not organized in a manner that allows the user to easily select the product item that he wishes to purchase. For example, the query specifying "SONY DVD Player" may return 100 item listings, where TABLE 1 consists of the first 30 listings (listings 6 through 25 are not shown) of the 100 item listings.

Item listings No. 1, No. 26 and No. 29 represent the same product item: Sony DVPS-550D DVD Player. Item listings No. 1 and No. 26 shows that the product item is priced at $399 while item listing No. 29 shows that the product item is priced at $352. If the user is shopping for the cheapest price, the user may easily miss item listing No. 29 because item listing 29 is farther down in the list. Item listings that represent the same product item are hereafter referred to as item listing variants. Thus, the problem of the multiplicity of item listing variants is exacerbated because the item listing variants are presented to the user in a scattered fashion.

Another problem may be that the various sources from which item listings are extracted may themselves provide inconsistent information on item names. For example, in TABLE 1 item listing No. 5 and item listing No. 27 represent the same product item but have different item names: Sony DVPC-650D DVD Player and Sony DVP-C650D DVD Player, respectively. Also, such sources may provide different information on prices and other product information associated with the item names.

Given the current demand for data processing in the context of online shopping and the limitations in the prior approaches, an approach for organizing product information that does not suffer from limitations associated with conventional data processing approaches is highly desirable. In particular, an approach for organizing data that addresses the problem of presenting a multiplicity of item listing variants to the user is needed.

SUMMARY OF THE INVENTION

A computer-implemented approach is provided for organizing input listings from various sources of input listings. Input listings are organized by mapping the input listings to consolidated listings. Various techniques are disclosed for mapping the input listings to the consolidated listings, including a Product Code normalization technique, a name/title normalization technique, and a model normalization technique. Instead of presenting results to a search query for a product in a scattered fashion, consolidated listings, which are listings related to the same product, are presented in response to the search query.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are, depicted in block diagram form in order to avoid unnecessarily obscuring the invention.

Consolidated Listings

To avoid situations in which item listings for the same product are scattered among the search results, the listings that relate to a particular product may be presented as one consolidated item listing, herein referred to as a "consolidated listing". For example, in TABLE 1, item listings No. 1, No. 26 and No. 29 relate to the same product. Assume that more merchants use the item name "Sony DVP-S550D DVD Player" than the item name "Sony DVPS-550D DVD Player" to represent the particular product item identified in item listings No. 1, No. 26 and No. 29. Thus, a single consolidated listing that represents item listings No. 1, No. 26 and No. 29 may have the item name "Sony DVP-S550D DVD Player".

In response to a user who submits the query search "SONY DVD Player", the single consolidated listing, "Sony DVP-S550D DVD Player", may be initially presented to the user instead of item listings No. 1, No. 26 and No. 29. If the user is interested in a particular consolidated listing, the user may then select the particular consolidated listing. In response to the user's selection of the particular consolidated listing, all the item listing variants that are represented by the particular consolidated listing are presented to the user. For example, if the user selects the consolidated listing, "Sony DVP-S550D DVD Player", then item listings No. 1, No. 26 and No. 29 will be presented to the user.

Functional Overview

In order to address the problem of presenting a multiplicity of item listing variants to the user in an organized manner, various techniques are provided to facilitate the creation and delivery of consolidated listings that are based on input listings received from multiple sources.

Figure 1:
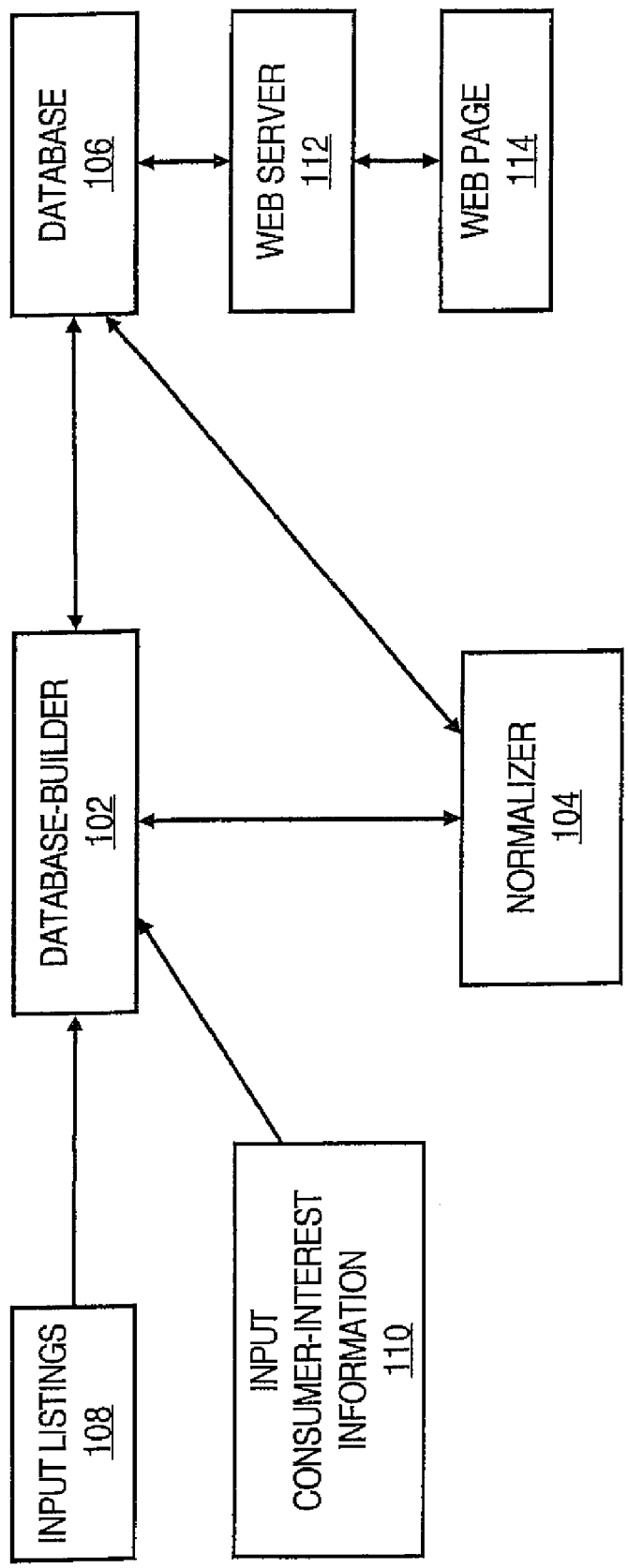
FIG. 1 is a block diagram that illustrates a system overview of organizing input listings.

FIG. 1 is a block diagram that illustrates an overview of a system for organizing input listings in a manner that facilitates the use of consolidated listings. Database-builder 102 is operatively coupled to normalizer 104, and to database 106. Normalizer 104 is also operatively coupled to database 106. Web server 112 is operatively coupled to database 112. Web server 112 displays consolidated listings from database 106 on web page 114.

In certain embodiments of the invention, Database-builder 102 receives input listings 108 and input consumer-interest information 110. Input listings are item listings from various sources. Examples of input listings 108 are item listings from various merchant catalogs. Input consumer-interest information 110 comprises any type of information about product items. Examples of input consumer-interest information 110 are product reviews, consumer-ratings on a product, product recall information provided by consumer-interest groups, and manufacturers.

According to certain embodiments of the invention, Database-builder 102 sends input listings to normalizer 104 for immediate processing, as the input listings are received ("on-line" processing). In other embodiments, the input listings 108 are stored when they are received rather than being sent to normalizer 104 immediately for processing. In such a case, normalizer 104 processes the input listing "off-line". During the processing of the input listings, normalizer 104 retrieves from database 106 for each input listing, the consolidated listing that corresponds to the input listing, if any.

Normalizer 104 maps the input listings either to consolidated listings retrieved from database 106 or to a new consolidated listing created by the normalizer 104. The mapping of input listings to consolidated listings is based on attribute values that are in common between the input listings and the consolidated listings. Examples of different types of attribute values include, but are not limited to, name value, brand value, Product Code value, model value, title value, author value. A Product Code value is a product identifier. Examples of types Product Code values are Stock Keeping Unit (SKU) value, Universal Product Code (UPC) value, and International Standard Book Number (ISBN) value. In general, Product Code values are numeric values.

Normalizer 104 uses various techniques that are described herein for mapping input listings and input consumer-interest information to consolidated listings. The input listings that are mapped to consolidated listings retrieved from database 106 or to new consolidated listings are stored in database 106. Any new consolidated listings created by normalizer 104 are also stored in database 106. Normalizer 104 also maps input consumer-interest information to consolidated listings.

In one embodiment, the techniques for mapping input consumer-interest information to consolidated listings are similar to those for mapping input listings to consolidated listings. The task of mapping input listings and input consumer-interest information to consolidated listings is herein referred to as item-listing-to-consolidated-listing matching.

In response to a search query, search results comprising consolidated listings are displayed on web page 114. If one of the consolidated listings that is displayed on web page 114 is selected, then all input listings and input consumer-interest information, which have been mapped to the selected consolidated listing, are displayed on web page 114.

Item-Listing-to-Consolidated-Listing Matching Techniques

Figure 2:
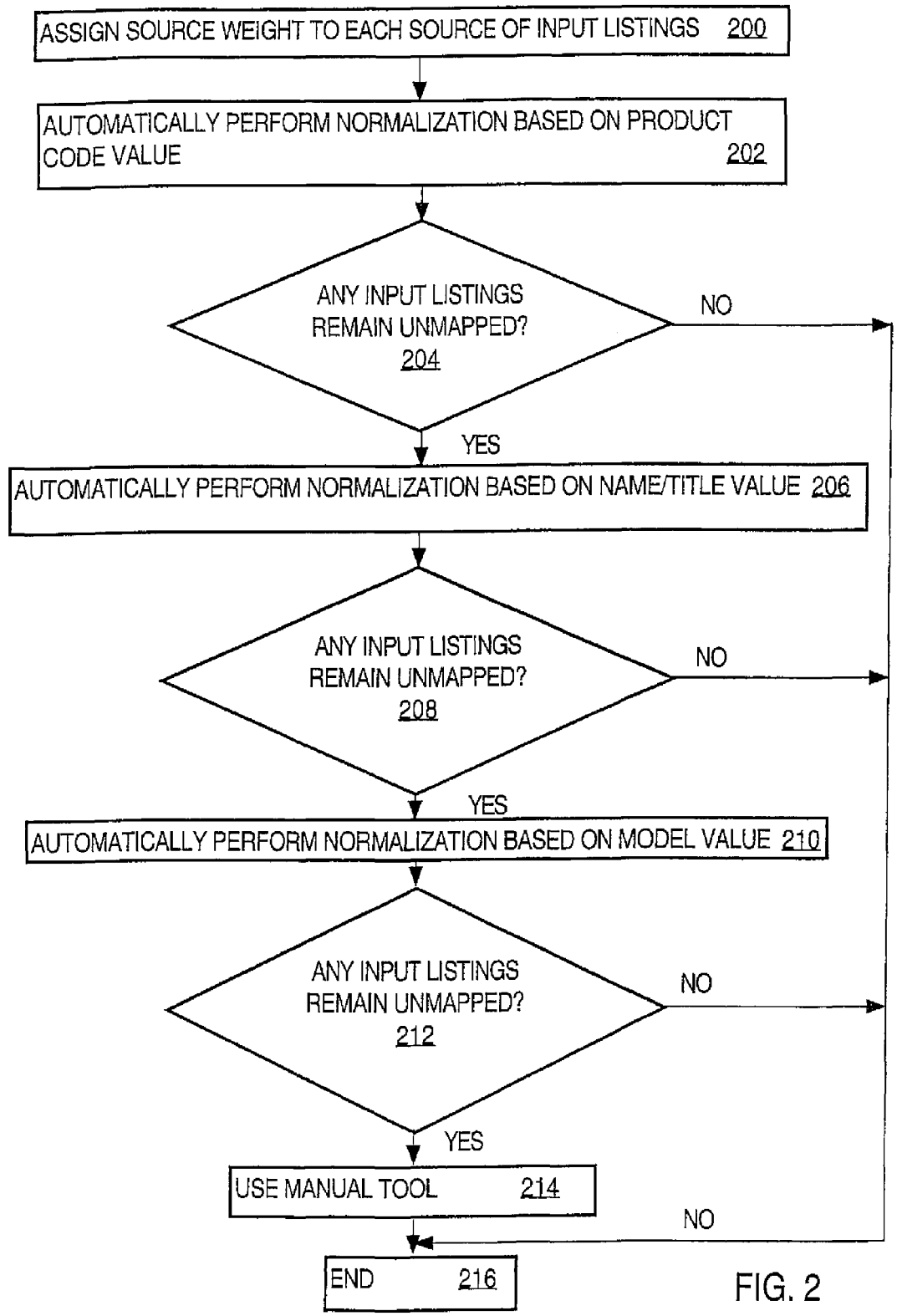
FIG. 2 is block diagram that illustrates one technique for mapping input listings to consolidated listings.

FIG. 2 is block diagram that illustrates One technique for mapping input listings to consolidated listings, according to certain embodiments of the invention. In the embodiment illustrated in FIG. 2, a series of item-listing-to-consolidated-listing matching techniques are employed. If one item-listing-to-consolidated-listing matching technique does not successfully identify a consolidated listing for an input listing, then the next item-listing-to-consolidated-listing matching technique in the series is used to try to identify a consolidated listing for the input listing.

Referring to FIG. 2, at block 200, a source weight is assigned to each source of input listings. Source weights are used for creating a new consolidated listing as explained in greater detail herein in the section entitled, "New Consolidated Listing".

Weights may be assigned to sources based on an evaluation of each source of input listings. Evaluation of a source may be performed by taking, as samples, input listings from the source that is being evaluated and comparing the samples with like samples from a trusted source. If the samples of the source have a strong correlation with the samples from the trusted source, the source is assigned a higher source weight. On the other hand, if the samples from the source have a weak correlation with the samples from the trusted source, then the source is assigned a lower source weight.

Another technique of evaluating a source is based on the number of input listings from the source, which have the same Product Code value as an existing consolidated listing. The greater the number (or percentage) of input listings that have the same Product Code value as existing consolidated listings, the higher the source weight.

At block 202, item-listing-to-consolidated-listing matching of the input listings is automatically performed based on the Product Code value of each input listing. Item-listing-to-consolidated-listing matching of input listings based on the Product Code value is herein referred to as auto-Product Code matching. Auto-Product Code matching is explained in greater detail below.

At block 204, it is determined whether there are any input listings that remain unmapped to any consolidated listing. If it is determined that there are no input listings that remain unmapped to any consolidated listing, then at block 216 the item-listing-to-consolidated-listing matching operation ends.

If it is determined that there are input listings that remain unmapped to any consolidated listing, then at block 206, item-listing-to-consolidated-listing matching of the input listings that remain unmapped is automatically performed based on the name value or title value of each input listing. Item-listing-to-consolidated-listing matching of input listings based on the name value or title value is herein referred to as auto-name matching. Auto-name matching is explained in greater detail below.

At block 208, it is determined whether there are any input listings that remain unmapped to any consolidated listing. If it is determined that there are no input listings that remain unmapped to any consolidated listing, then at block 216 the item-listing-to-consolidated-listing matching operation ends.

If it is determined that there are input listings that remain unmapped to any consolidated listing, then at block 210, item-listing-to-consolidated-listing matching of the input listings that remain unmapped is automatically performed based on the model value of each input listing. Item-listing-to-consolidated-listing matching of input listings based on the model value is herein referred to as auto-model matching. Auto-model matching is explained in greater detail below.

At block 212, it is determined whether there are any input listings that remain unmapped to any consolidated listing. If it is determined that there are no input listings that remain unmapped to any consolidated listing, then at block 216 the item-listing-to-consolidated-listing matching operation ends.

If it is determined that there are input listings that remain unmapped to any consolidated listing, then at block 214, item-listing-to-consolidated-listing matching of the input listings that remain unmapped is performed using a manual tool. The order of performing the auto item-listing-to-consolidated-listing matching techniques as described in FIG. 2 is merely illustrative. The order of performing the auto-item-listing-to-consolidated-listing matching techniques may vary from implementation to implementation. The present invention is not limited to any particular order of performing the auto-item-listing-to-consolidated-listing matching techniques.

Attribute Value Normalization

According to certain embodiments of the invention, before the task of mapping of input listings to consolidated listings is performed, attribute values of the input listings are "normalized". That is, all attribute values that represent the same information item are mapped to a single value.

For example, assume that several input listings have brand values that represent a single brand. Although the brand values represent a single brand, the brand values may vary slightly, one from the other. For example, different listings may have brand values "ACME", "ACME Co.", "ACME Company", and "ACME Brand", all of which are meant to identify the same brand.

Attribute values that represent the same thing but which vary slightly one from the other, are herein referred to as attribute value variants. For example, the following brand value variants may be mapped to the single brand value, "Apple Computer":

Brand value variant 1: Apple Computer Company
Brand value variant 2: Apple
Brand value variant 3: Apple Computer, Inc.

The mapping of attribute values that represent the same thing to a single value as described above is herein referred to as attribute normalization. Various techniques may be used to perform attribute normalization. One such technique is described in U.S. patent application Ser. No. 09/653,040 entitled "ITEM NAME NORMALIZATION" filed by Arkady Borkovsky on Sep. 1, 2000, the contents of which is incorporated herein by reference.

In certain embodiments of the invention, the attributes of any given consolidated listing comprise normalized values, where the normalized attribute values are obtained by applying the attribute normalization techniques described herein. In other embodiments, the attribute values of a given consolidated listing are attribute values that are selected from a "trusted" source of input listings. The attribute values selected from the trusted source of input listings are deemed to be normalized values. A "trusted" source of input listings is a source that has a history of producing accurate input listings.

Auto-Product Code Matching

Figure 3A:
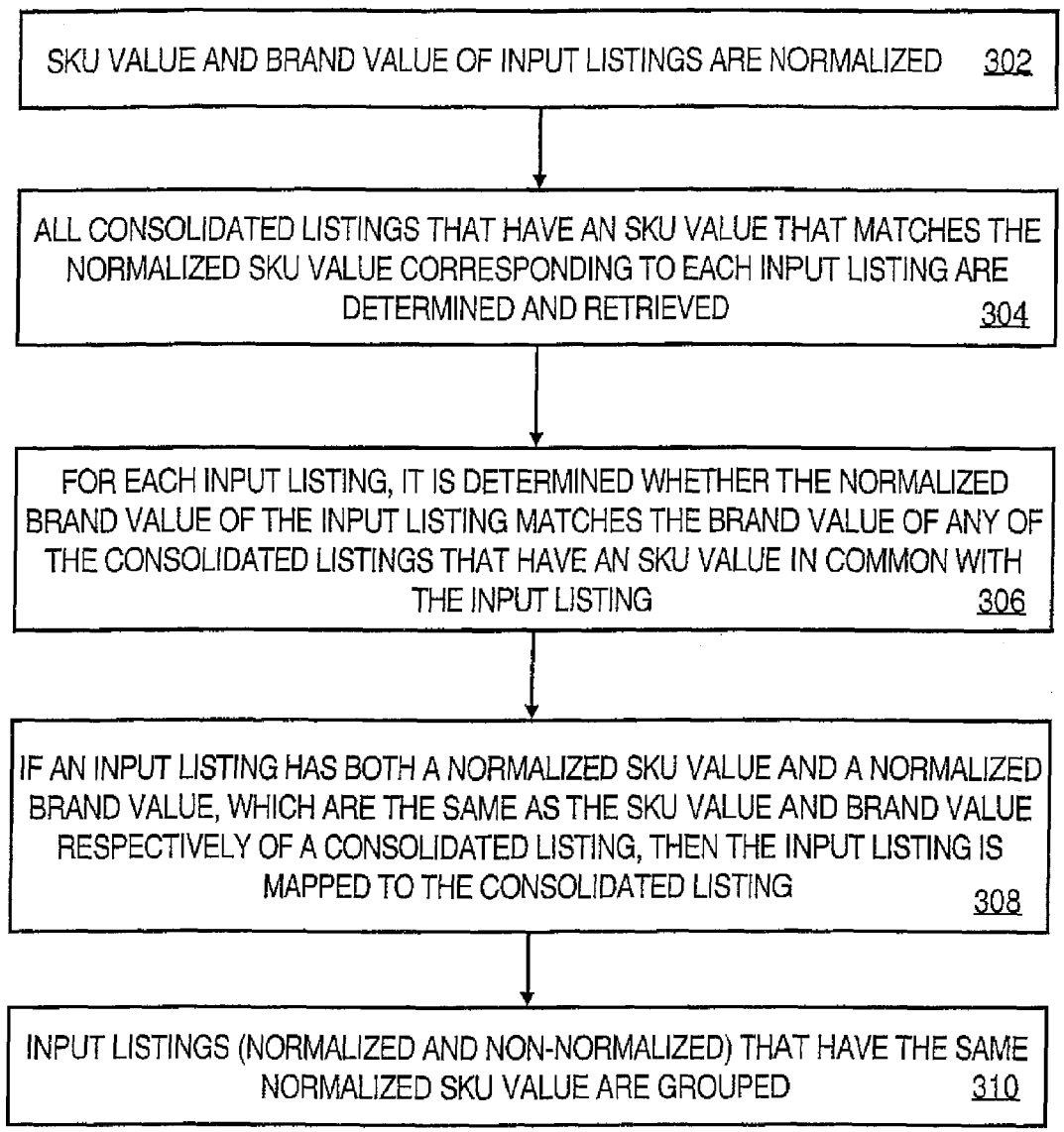
FIG. 3A and FIG. 3B are flowcharts that illustrate a technique of mapping input listings based on the SKU value of each input listing.
Figure 3B:
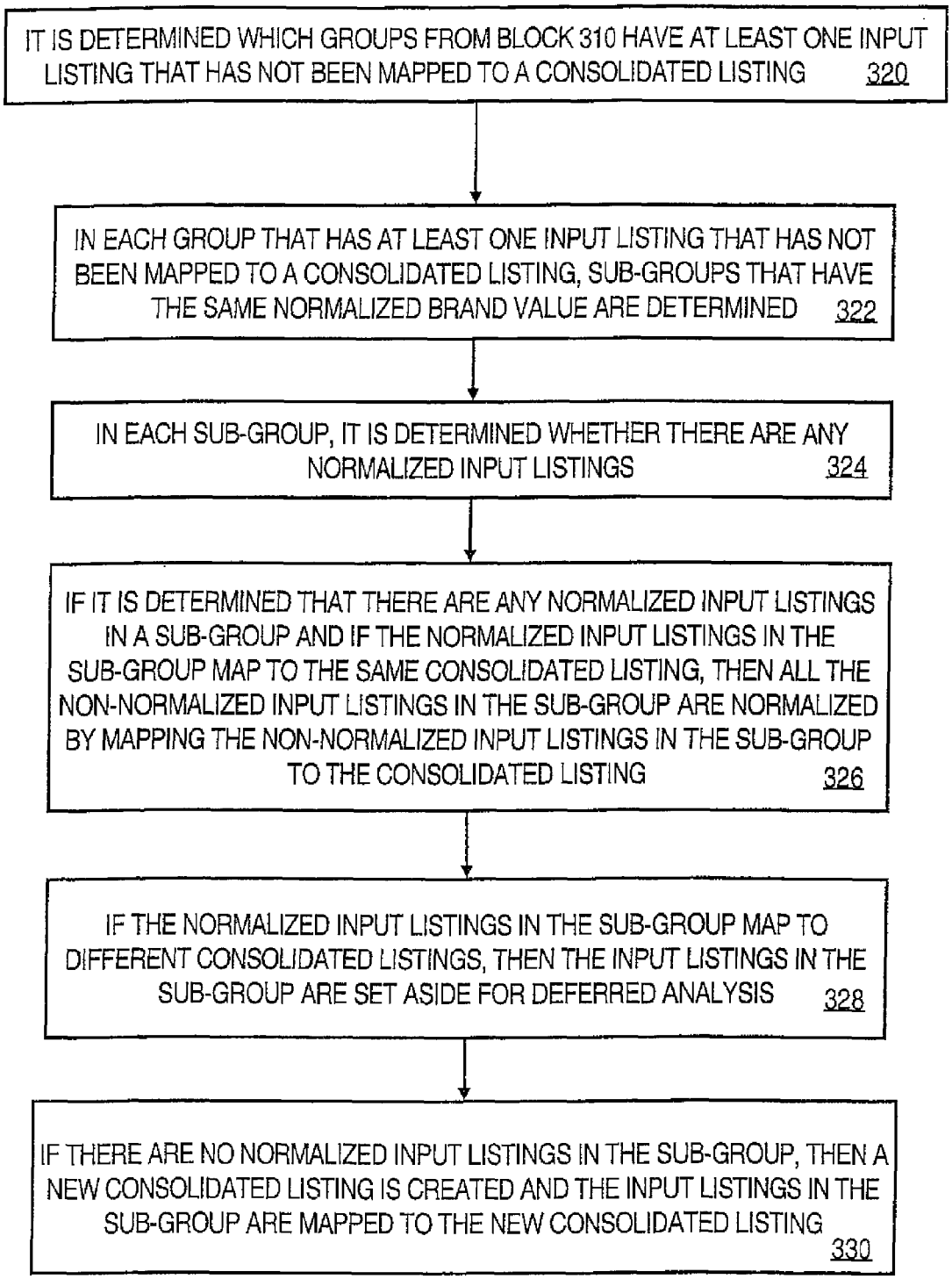

FIG. 3A and FIG. 3B are flowcharts that illustrate a technique of mapping input listings to consolidated listings based on the Product Code value of each input listing. For the purpose of explanation, the technique of mapping input listings to consolidated listings based on the Product Code value is described with respect to an SKU value, which is a type of Product Code. At block 302 of FIG. 3A, the SKU value and brand value of each input listing is normalized as described in the section entitled, "ATTRIBUTE NORMALIZATION".

At block 304, all existing consolidated listings that have a SKU value that matches the normalized SKU value of an input listing are identified and retrieved from database 106 of FIG. 1. At block 306, it is determined whether the normalized brand value of the input listing matches the brand value of any consolidated listing that has a SKU value in common with the input listing.

At block 308, if an input listing has both a normalized SKU value and a normalized brand value that match the SKU value and brand value, respectively, of a consolidated listing, then the input listing is mapped to the consolidated listing.

At block 310, input listings, both those that have been mapped to a consolidated listing and those which have not, that have the same normalized SKU value are grouped together. At block 320 of FIG. 3B, it is determined which groups from block 310 of FIG. 3A have at least one input listing that has not been mapped to a consolidated listing.

At block 322, in each group that has at least one input listing that has not been mapped to a consolidated listing, sub-groups that have the same normalized brand value are determined. At block 324, in each sub-group, it is determined whether there are any normalized input listings. If it is determined that there are normalized listings in a sub-group and if the normalized listings in the sub-group map to the same consolidated listing, then all the non-normalized input listings in the sub-group are mapped to the consolidated listing.

At block 328, if the normalized input listings in the sub-group map to different consolidated listings, then the input listings in the sub-group are set aside for deferred analysis. If it is determined that there are no normalized input listings in a sub-group, then at block 330, a new consolidated listing is created, and the input listings in the sub-group are mapped to the new consolidated listing. The creation of a new consolidated listing is explained below.

New Consolidated Listing

If there are no normalized input listings in a sub-group, then the sources of the listings in the sub-group are determined. The sum of the source weights of the sources is then calculated for the sub-group, wherein a source is counted only once. For example, assume that the sub-group contains listings L1, L2, L3, L4, L5. L1, L2 and L3 are from source A, while L4 is from source B and L5 is from source C. Sources A, B, and C have source weights of 6, 8 and 9 respectively. The sum of the source weights for the sub-group is 6+8+9=23. If the sum of the source weights for the sub-group is greater than a pre-selected numeric threshold, then a new consolidated listing is created for the sub-group. In certain embodiments, the new consolidated listing may be the item listing that originated from the source with the highest source weight.

Auto-Name/Title Item-Listing-to-Consolidated-Listing Matching

Figure 4A:
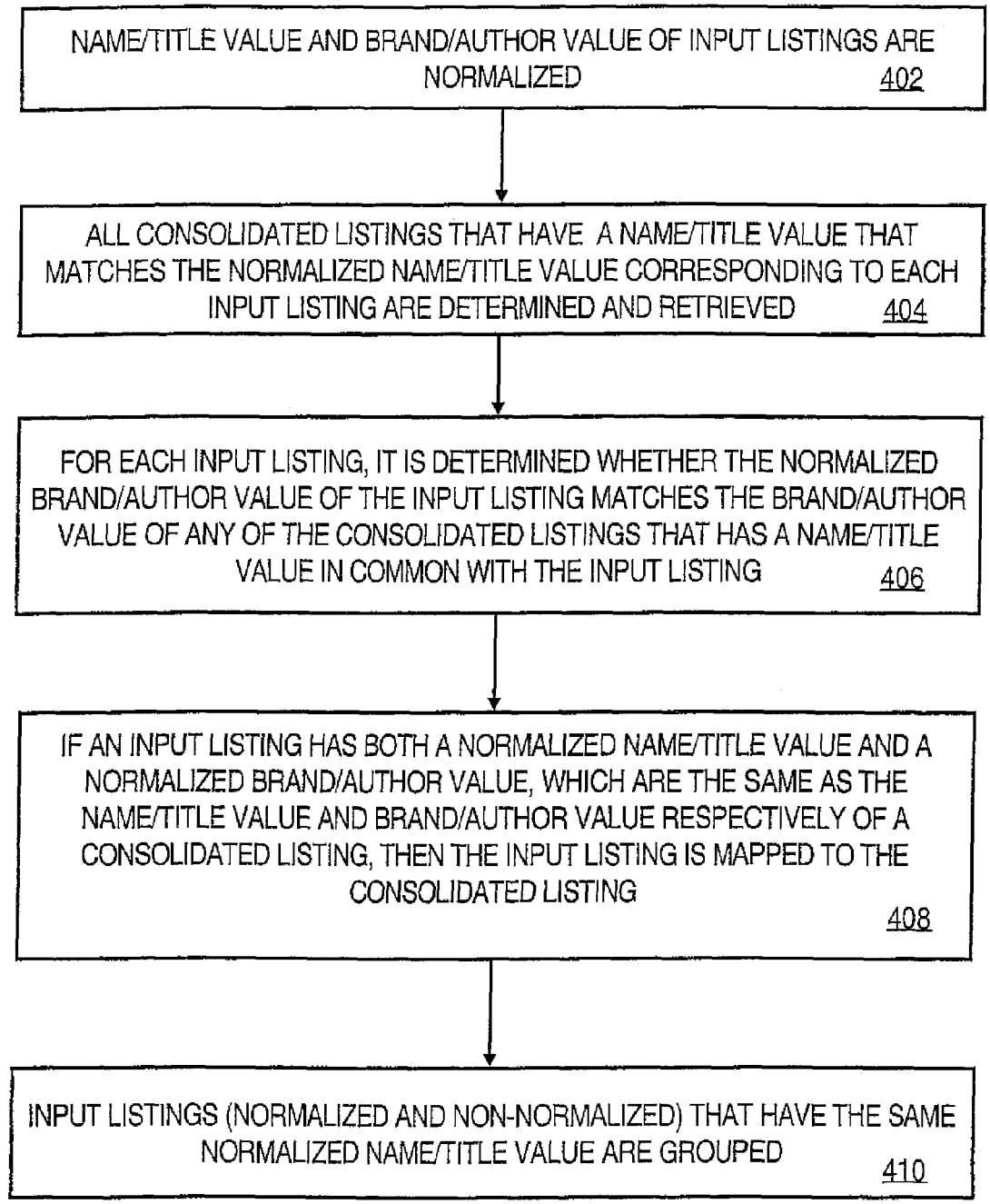
FIG. 4A and FIG. 4B are flowcharts that illustrate a technique of mapping input listings based on the name/title value of each input listing.
Figure 4B:
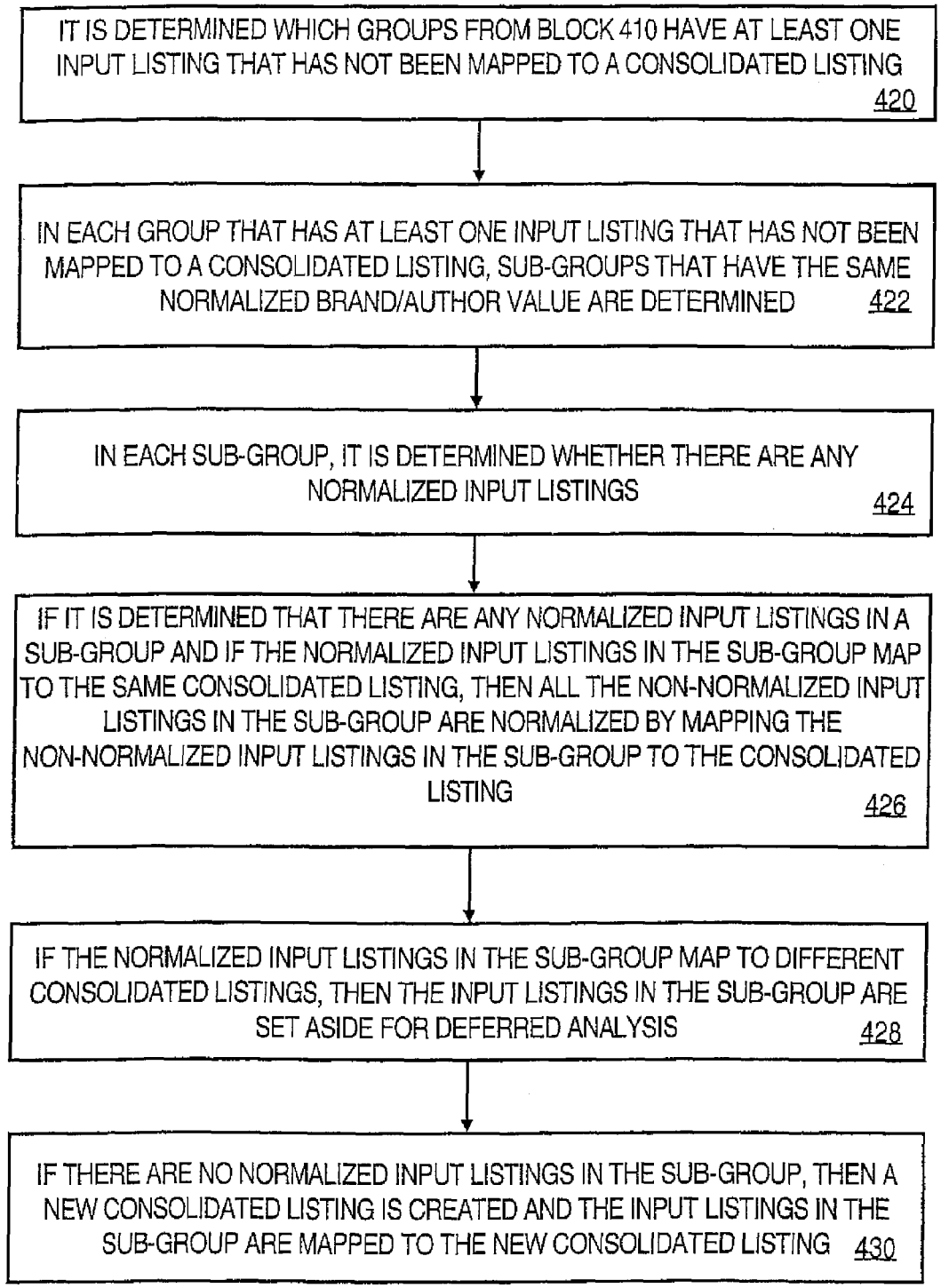

Examples of product items that have a "title" attribute value are books, video-taped motion pictures, music recorded on recording media, etc. Thus, the title attribute value is a special case of the name attribute value. FIG. 4A and FIG. 4B are flowcharts that illustrate a technique of mapping input listings based on the name/title value of each input listing.

At block 402 of FIG. 4A, the name/title value and the brand/author value of input listings that have not been mapped to any consolidated listing are normalized as described in the section entitled, "ATTRIBUTE NORMALIZATION". At block 404, all consolidated listings that have a name/title value that matches the normalized name/title value corresponding to an input listing are identified and retrieved from database 106 of FIG. 1.

At block 406, for each input listing, it is determined whether the normalized brand/author value of the input listing matches the brand/author value of any consolidated listing that has a name/title value in common with the input listing. At block 408, if an input listing has both a normalized name/title value and a normalized brand/author value, which are the same as the name/title value and brand/author value respectively, of a consolidated listing, then the input listing is mapped to the consolidated listing. At block 410, input listings, both those that have been mapped to a consolidated listing and those that have not, that have the same normalized name/title value are grouped together. At block 420 of FIG. 4B, it is determined which groups from block 410 of FIG. 4A have at least one input listing that has not been mapped to a consolidated listing.

At block 422, in each group that has at least one input listing that has not been mapped to a consolidated listing, sub-groups that have the same normalized brand/author value are determined. For example, the author value of one input listing may be compared to the author value of another input listings as follows: step 1) create a first list comprising the separate components of the author value, such as, first name, middle name or initials, and last name, of one input listing; step 2) create a second list comprising the separate components of the author value of the other input listing; step 3) remove a name from the first list and remove the corresponding name or corresponding initial from the second list; 4) repeat step 3 until all the names from the first list have been removed; 5) if only initials remain in both lists, then the two author values are deemed to be the same values.

At block 424, in each sub-group, it is determined whether there are any input listings that have been mapped to a consolidated listing. If it is determined that there are listings in the sub-group that have been mapped to a consolidated listing and if those listings map to the same consolidated listing, then all the input listings that have not been mapped to a consolidated listing in the sub-group are mapped to the consolidated listing. At block 428, if the input listings that have been mapped to a consolidated listing in the sub-group map to different consolidated listings, then the input listings in the sub-group are set aside for deferred analysis. If it is determined that there are no input listings that have been mapped to a consolidated listing in a sub-group, then at block 430, a new consolidated listing is created, and the input listings in the sub-group are mapped to the new consolidated listing. The creation of a new consolidated listing is explained herein in the section entitled, "New Consolidated Listing".

Auto-Model Matching

Figure 5A:
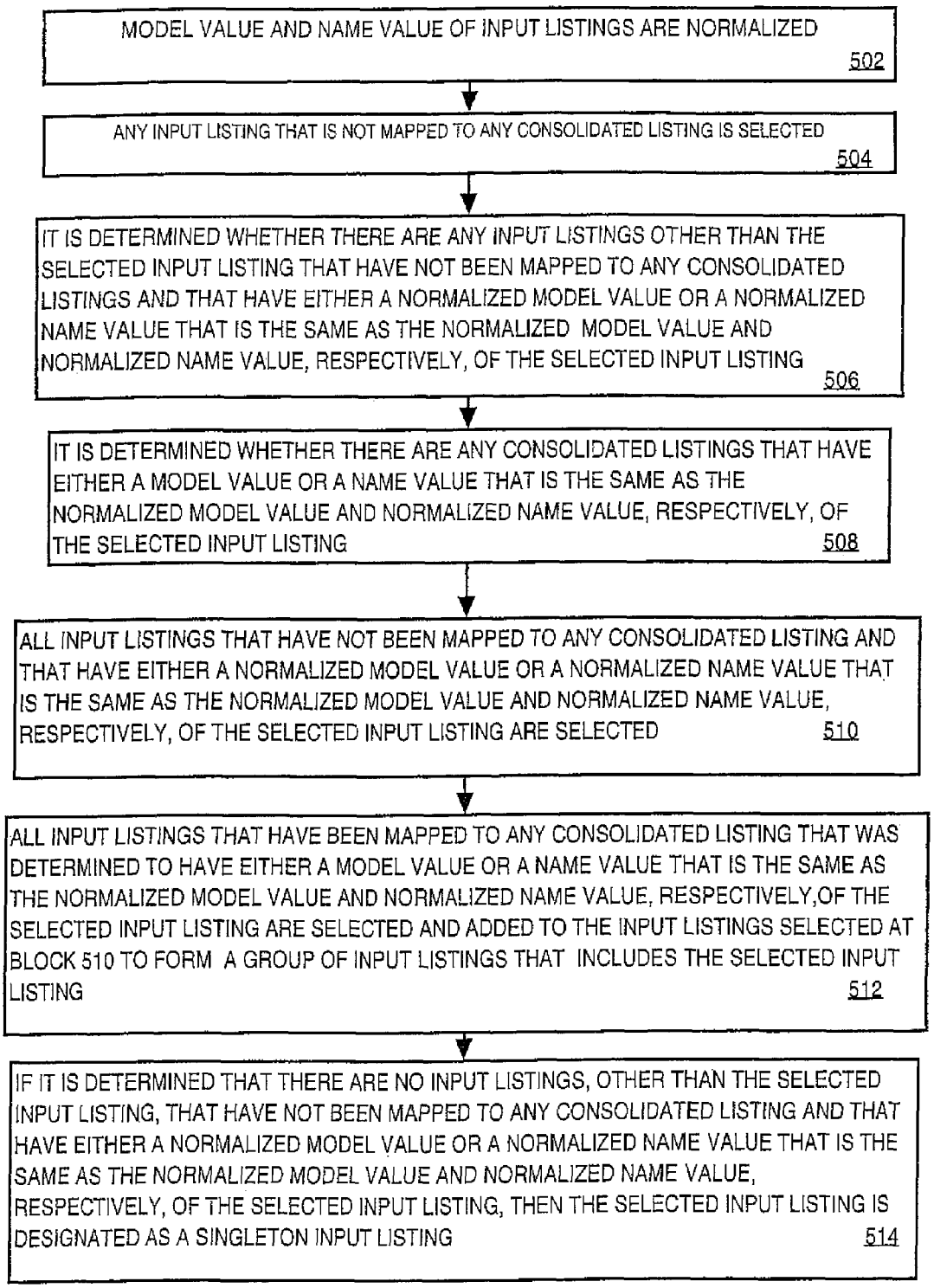
FIG. 5A and FIG. 5B are flowcharts that illustrate a technique of mapping input listings based on the model value of each input listing.
Figure 5B:
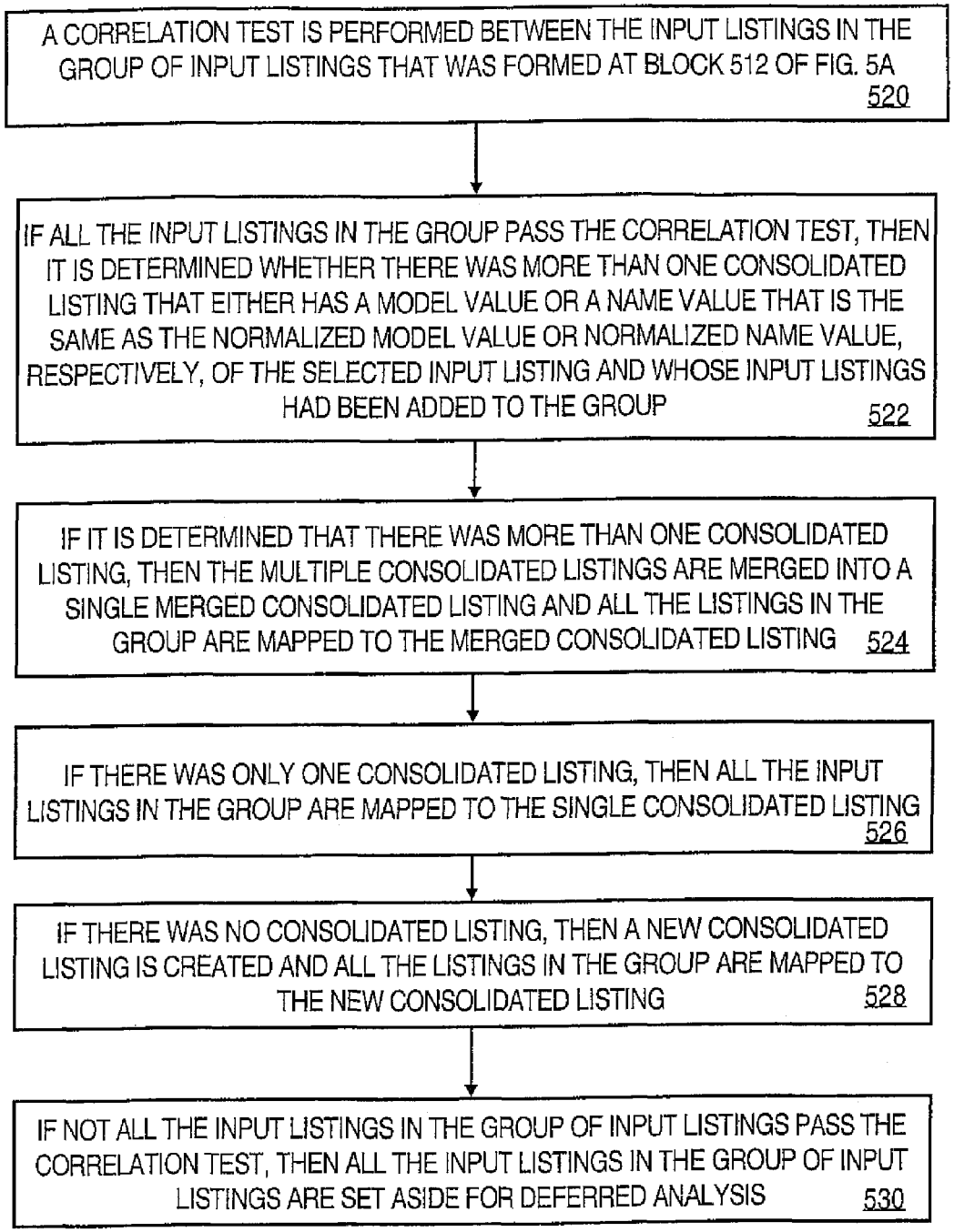

FIG. 5A and FIG. 5B are flowcharts that illustrate a technique of mapping input listings to consolidated listings based on the model value of each input listing. At block 502, the model value and name value of input listings that have not been mapped to any consolidated listing are normalized. At block 504, any input listing that is not mapped to any consolidated listing is selected in order to start the mapping technique based on the model value.

At block 506, it is determined whether there are any input listings other than the selected input listing that have not been mapped to any consolidated listing and that have either a normalized model value or a normalized name value that is the same as the normalized model value or normalized name value respectively of the selected input listing.

At block 508, it is determined whether there are any consolidated listings that have either a model value or a name value that is the same as the normalized model value and normalized name value of the selected input listing. For example, all consolidated listings that have a model value or a name value that matches the normalized model value or the normalized name value respectively of the selected input listing is identified and retrieved from database 106 of FIG. 1.

At block 510, all input listings that have not been mapped to any consolidated listing and that have either a normalized model value or a normalized name value that is the same as the normalized model value or normalized name value respectively of the selected input listing are selected. At block 512, all input listings that have been mapped to any consolidated listing that was determined to have either a normalized model value or a normalized name value that is the same as the normalized model value or normalized name value respectively of the selected input listing are selected and added to input listings selected at block 510 to form a group of input listings that includes the selected input listing. At block 514, if it is determined that there are no input listings other than the selected input listing that has not been mapped to any consolidated listing and that have either a normalized model value or a normalized name value that is the same as the normalized model value or normalized name value respectively of the selected input listing, then the selected input listing is designated as a singleton input listing. The singleton input listing is its own consolidated listing.

At block 520 of FIG. 5B, a suite of correlation tests is performed between the input listings in the group of input listings of block 512 of FIG. 5A. At block 522, if all the input listings in the group pass the suite of correlation tests, then it is determined whether there was more than one consolidated listing that either has a model value or a name value that is the same as the normalized model value or normalized name value respectively of the selected input listing and whose input listings had been added to the group of input listings.

At block 524, if it is determined that there was more than one consolidated listing, then the multiple consolidated listing is merged into a single merged consolidated listing and all the listings in the group are mapped to the merged consolidated listing. If at block 524, it is determined that there was only one consolidated listing, then at block 526, all the input listings in the group are mapped to the single consolidated listing. If at block 524, it is determined that there was no consolidated listing, then at block 528, a new consolidated listing is created and all the input listings in the group of input listings are mapped to the new consolidated listing. The creation of a new consolidated listing is explained herein in the section entitled, "New Consolidated Listing". At block 530, if not all the input listings in the group of input listings pass the correlation test, then all the input listings in the group of input listings are set aside for a deferred analysis.

Suite of Correlation Tests

In order to quantify the correlation level for any group of input listings, wherein the group of input listings is determined as described herein with respect to FIG. 5A and FIG. 5B, a parameter, $\beta$, the "Listing-Match Friction", is defined. To calculate $\beta$ for a group of input listings, the following formula is used:

$$\beta = \Sigma \omega_i \phi_i$$

where $\phi_i$ is the worst correlation value among all input listings within the group of input listings, for a given correlation criteria, $\chi_i$; and $\omega_i$ is the weight associated with that correlation criteria, $\chi_i$.

The higher value for $\beta$, the lower the correlation among input listings in the group of input listings.

According to certain embodiments of the invention, the suite of correlation tests comprise a name correlation test, a numbers-in-the-name correlation test, a price correlation test, a category correlation test, a brand correlation test, and a model correlation test. The suite of correlation tests may vary from implementation to implementation. The present invention is not limited to any particular suite of correlation tests.

According to one embodiment of the invention, four correlation criteria, $\chi_1$-$\chi_4$, are used and are described as follows:

$\chi_1$ is a "Name Correlation" criterion, and the possible values for $\chi_1$ are:

0—passes a strict name correlation test (e.g. 80%)

1—passes a relaxed name correlation test (e.g. 40%), but fails a strict name correlation test 2—fails a relaxed name correlation test Each input listing in the group of input listings is assigned one of the possible values of $\chi_1$ depending on how the individual input listing performs in the Name Correlation test. The value of $\chi_1$ that is assigned to the poorest performing input listing in the group of input listings is the value that is assigned to $\phi_1$. For the purpose of explanation, assume that the poorest performing item listing gets a numerical value of 1 in the Name Correlation test, then 1 is assigned to $\phi_1$. If however, the poorest performing item listing gets a numerical value of 2, then 2 is assigned to $\phi_1$. The weight assigned to the Name Correlation test is: $\omega_1 = 1$.

$\chi_2$ is a "Number-in-Name Correlation" criterion, and the possible values for $\chi_2$ are:

0—all numbers in the listing names match

1—numbers in the listing names do not match

The value of $\chi_2$ that is assigned to the poorest performing input listing in the group of input listings for the Number-in-Name Correlation test is the value that is assigned to $\phi_2$. The weight assigned to the Number-in-Name Correlation test is: $\omega_2 = 3$.

$\chi_3$ is a "Price Correlation" criterion, and the possible values for $\chi_3$ are:

0—a price difference of 20% or less (strict price test)

1—a price difference greater than 20% and less than 30% (relaxed price test)

2—a price difference of 30% or more

The value of $\chi_3$ that is assigned to the poorest performing input listing in the group of input listings for the Price Correlation test is the value that is assigned to $\phi_3$. The weight assigned to the Price Correlation test is: $\omega_3 = 1$.

$\chi_4$ is a "Category Correlation" criterion, and the possible values for $\chi_4$ are:

0—passes a strict category correlation test

1—passes a relaxed category correlation test

2—fails a relaxed category correlation test

The value of $\chi_4$ that is assigned to the poorest performing input listing in the group of input listings for the Category Correlation test is the value that is assigned to $\phi_4$. The weight assigned to the Category Correlation test is: $\omega_4 = 1$.

From the above, the value of $\beta$ may be calculated to be $(\phi_1 + 3\phi_2 + \phi_3 + \phi_4)$ for any group of input listings. The smaller the value of $\beta$, the higher the correlation of input listings, and hence the better the matching. For this particular embodiment, it is found that for various product categories, when $\beta$ is in the range of (0~6), the correctness of input-listing-to-consolidated-listing matching is better than 99%, and when $\beta$ is in the range of (7~20), the input-listing-to-consolidated-listing matching results are better than 98%. To achieve these results, an additional general constraint is added in cases where the name correlation is 20% or less and the price difference is 40% or greater. The additional constraint sets the $\beta$ value to a high number (e.g. 1000). Plotting the correctness of the listing matches against the Listing-Match Friction value, $\beta$, enables one to determine threshold values for (a) automatically committing "listing match" results into the database, (b) determining input listings which should undergo manual review, and (c) programmatically disassociating input listings with respect to a given consolidated listing.

As described with reference to FIG. 5B, a suite of correlation tests is performed between all the input listings in the group of input listings of block 512. Each input listing in the group is tested against every listing in the group of input listings. In order to perform the suite of correlation tests, each input listing in the group of input listings is paired with every listing in the group of input listings. For example, if A, B, C, D are the input listings in the group of input listings, then the pairs of input listings on which the suite of correlation tests are performed are (A,B), (A,C), (A,D), (B,C), (B,D), (C,D).

Name Correlation Test

According to certain of embodiments of the invention, the name value of each input listing in the pair of input listings is split into separate components, where each separate component is a single alpha-numeric word. Only the separate components that do not contain any numerals are selected for correlation. A name correlation score is given to the pair of input listings based on the number of separate components that the pair of input listings have in conunon. To illustrate, assume that the name values and separate components of a pair of input listings are:

Name_value_1: Canon EOS 28-105 mm Usm Zoom Lens F3.5

Separate components of Name_value_1: "Canon", "EOS", "Usm", "Zoom", "Lens"

Name_value_2: EOS 28-105 mm Usm Zoom F3.5 Lens

Separate components of Name_value_2: "EOS", "Usm", "Zoom", "Lens"

From the above example, name_value_1 and name_value_2 have in common 4 our of 5 separate components, namely, "EOS", "Usm", "Zoom", "Lens". Thus, the name correlation score for the above example is 80%. If the pair of input listings score higher than a pre-selected threshold percentage value in the name correlation test, then the pair of input listings is deemed to have passed the correlation test. In certain embodiments of the invention, the pre-selected threshold is 20%.

Numbers-in-Name Correlation Test

According to certain of embodiments of the invention, the name value of each input listing in the pair of input listings is split into separate components, where each separate component is a single alpha-numeric word. The separate components that contain numerals are selected for correlation. A numbers-in-name correlation score is given to the pair of input listings based on the number of separate components that the pair of input listings have in common. To illustrate, assume that the name values and separate components of a pair of input listings are:

Name_value_1: Canon EOS 28-105 mm Usm Zoom Lens F3.5

Separate components of Name_value_1: "28", "105 mm", "F3.5"

Name_value_2: EOS 28-105 mm Usm Zoom F3.5 Lens

Separate components of Name_value_2: "128", "105 mm", "F3.5"

From the above example, name_value_1 and name_value_2 have in common 3 out of 3 separate components. Thus, the name correlation score for the above example is 100%. If the pair of input listings score higher than a pre-selected threshold percentage value in the name correlation test, then the pair of input listings is deemed to have passed the correlation test. In certain embodiments of the invention, the pre-selected threshold is 100%.

Price Correlation Test

According to certain of embodiments of the invention, there are two types of price correlation tests: 1) strict price correlation test, 2) relaxed price correlation test. When one of the input listings in the pair of input listings has no price, then the price correlation test is omitted for the pair of input listings. The strict price correlation test has a low pre-selected threshold with respect to the difference in price between the input listings in the pair. The relaxed price correlation test has a high pre-selected threshold with respect to the difference in price between the input listings in the pair. In certain embodiments of the invention the pre-selected threshold for the strict price correlation test and the relaxed price correlation test are respectively, 20% and 40%.

Category Correlation Test

Typically, a category value comprises a tree of values where each leaf, going from left to right, represents a deeper level of sub-category. A category correlation score is given to the pair of input listings depending on which level of sub-category that the pair of input listings match. To illustrate, assume that the category values and separate components of a pair of input listings are:

Category_value_1: Consumer electronics/cameras/accessories/camera lenses

Category_value_2: Consumer electronics/cameras/accessories/

According to certain embodiments of the invention, there are two types of category correlation tests: 1) strict category correlation test, and 2) relaxed category correlation test. According to the strict category test, the two category values must match at all levels of sub-category. According to the relaxed category test, the two category values must match through the second level of sub-category. From the above example, category_value_1 and category_value_2 match through the third level of sub-category. Thus the pair of input listings would pass the relaxed category correlation test but would fail the strict category correlation test.

Model Correlation Test

According to certain embodiments of the invention, the model value of each input listing in the pair of input listings must match exactly. However, if one input listing in the pair has no model value, then the model correlation test is omitted for the pair of input listings.

Brand Correlation Test

According to certain embodiments of the invention, the brand value of each input listing in the pair of input listings must match exactly. However, if one input listing in the pair has no brand value, then the brand correlation test is omitted for the pair of input listings.

Deferred Analysis

According to certain embodiments of the invention, input listings that have not been mapped to consolidated listings by the automatic SKU, name, and model item-listing-to-consolidated-listing matching techniques described herein are mapped to consolidated listings during deferred analysis. Deferred analysis involves using a semi-automated tool. Input listings that were previously set aside are retrieved one at a time by a human analyst. The analyst uses a semi-automated tool to retrieve input listings that have already been mapped and/or consolidated listings that the user thinks are similar to the input listing that is being analyzed. The analyst exercises his discretion in mapping the input listing to a consolidated listing or designating the input listing as a singleton input listing.

Hardware Overview

Figure 6:
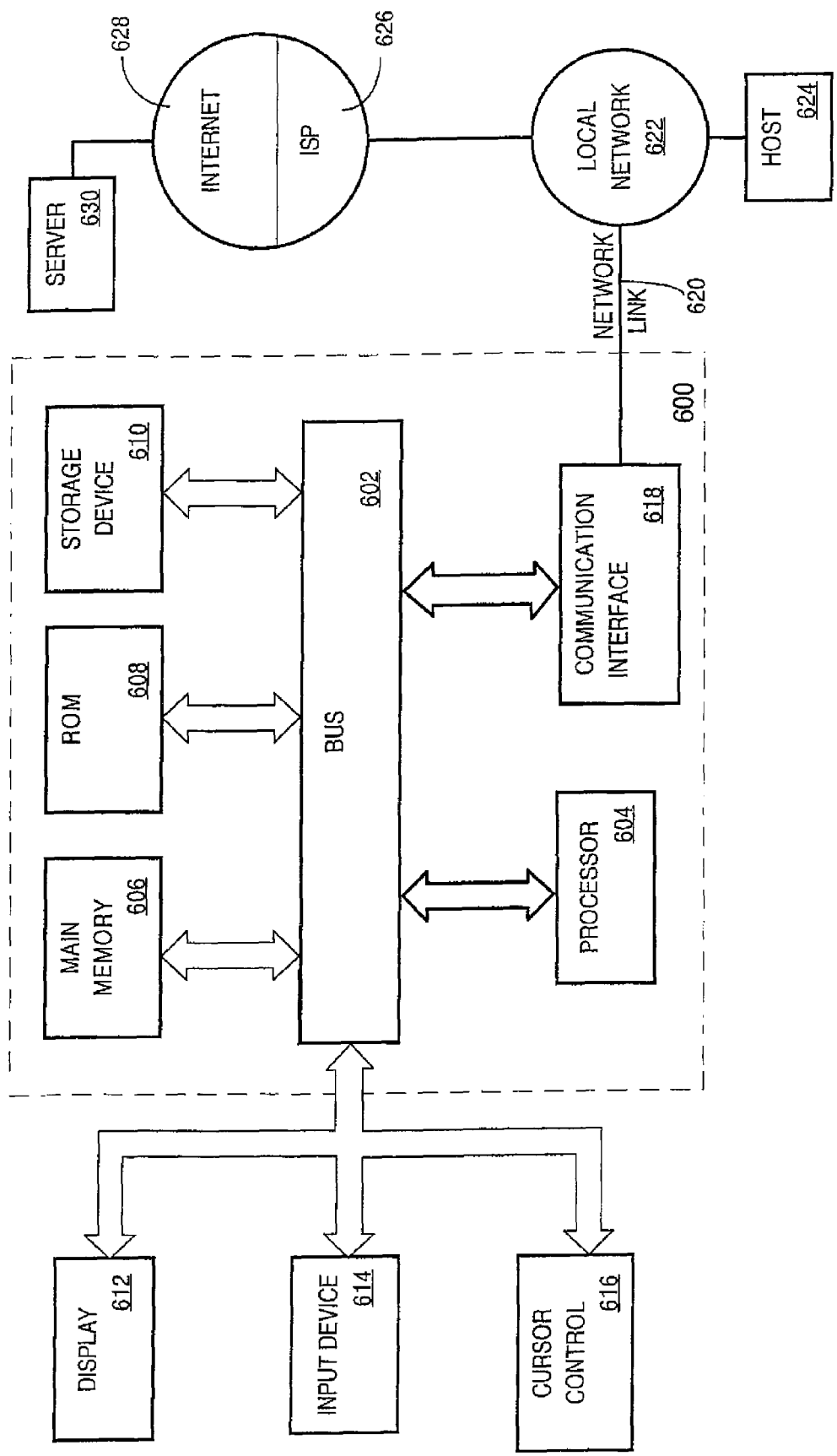
FIG. 6 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are implemented by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application implements the techniques described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

The invention claimed is:

1. A computer-implemented method of mapping input listings to consolidated listings, the method comprising:
   receiving a plurality of input listings from one or more sources, wherein the plurality of input listings comprise different item listing variants for a particular product;
   establishing, from the plurality of input listings, a group of input listings that share one or more common attribute values representing the particular product;
   determining via a computer processor, for the group of input listings, a single corresponding consolidated listing based on attribute values associated with the input listings in the group of input listings and attribute values associated with consolidated listings, wherein the determined consolidated listing represents the particular product;
   mapping each input listing in the group of input listings to the determined consolidated listing;
   storing each mapped input listing in a memory; and
   transmitting, to a client device associated with a user, for display, the consolidated listing rather than different item listings variants representing the particular product.

2. The method of claim 1, further comprising:
   mapping individual input listings from said plurality of input listings to consolidated listings based on a comparison between attribute values of the individual input listings and attribute values associated with said consolidated listings.

3. The method of claim 1, further comprising:
   determining normalized forms of one or more attributes of the input listings; and
   comparing the normalized forms of the one or more attributes of the input listings and attribute values associated with said consolidated listings.

4. The method of claim 3, wherein normalized forms of one or more attributes of the input listings are grouped together.

5. The method of claim 1, wherein establishing a group of input listings further comprises:
mapping all variant attribute values that represent the same information to a corresponding normalized form.

6. The method of claim 1, further comprising:
receiving, via the client device, a search query from the user that specifies an item listing variant for a particular product;
determining, based on mapping information, the consolidated listing mapped to the specified item listing variant;
transmitting to the client device, in response to the search query, the determined consolidated listing for the particular product as a search result; and
transmitting to the client device in response to a user request, all the different item listing variants mapped to a determined consolidated listing.

7. The method of claim 1, wherein attribute values associated with the plurality of input listings include one or more of:
a name value;
a Product Code value;
a model value;
a title value;
an author value;
a brand value;
a Stock Keeping Unit (SKU) value;
a Universal Product Code (UPC) value; or
an International Standard Book Number (ISBN) value.

8. The method of claim 1, wherein determining for the group of input listings a consolidated listing further comprises:
determining whether there is any input listing in the group of input listings that is mapped to any consolidated listing; and
creating a new consolidated listing and mapping the input listings in the group of input listings to the new consolidated listing, if there are no input listings in the group of input listings that are mapped to any consolidated listing.

9. The method of claim 8, wherein creating a new consolidated listing further comprises:
assigning a source weight to each source from which any of the plurality of input listings is obtained;
calculating the sum of the source weights for the group; and
selecting an item listing from one of the sources in the group as the new consolidated listing, if the sum of the source weights is greater than a pre-selected numeric threshold.

10. The method of claim 1, wherein, if there are input listings in the group that map to different consolidated listings, then setting aside the input listings in the group for a deferred analysis.

11. The method of claim 10, wherein the deferred analysis includes using a manual tool to determine the corresponding consolidated listing for each input listing that has been set aside for deferred analysis.

12. The method of claim 1, wherein determining, for the group of input listings, a corresponding consolidated listing comprises:
performing a correlation test between input listings of the group of input listings.

13. The method of claim 12, wherein performing a correlation test comprises:
determining a worst name correlation value in the group of input listings for a name correlation test for a given correlation criteria;
determining a worst numbers_in_the_name correlation value in the group of input listings for a numbers_in_the_name correlation test;
determining a worst price correlation value in the group of input listings for the price correlation test;
determining a worst category correlation value in the group of input listings for performing the category correlation test; and
determining a listing-match-friction value for the group of input listings by taking a sum of the worst name correlation value, the worst numbers_in_the_name correlation value, the worst price correlation value and the worst category correlation value.

14. The method of claim 12, wherein performing a correlation test comprises performing one or more of:
a name correlation test;
a numbers_in_the_name correlation test;
a price correlation test;
a category correlation test;
a brand correlation test; or
a model correlation test.

15. The method of claim 14, wherein performing a name correlation test between input listings of the group of input listings comprises:
pairing input listings from the group of input listings such that each input listing is paired with every other input listing in the group to form pairs of input listings;
splitting a name value for each input listing in a pair of input listings into components, wherein each component includes an alpha-numeric word;
selecting components that do not contain any numerals for each input listing in the pair to be one or more selected components; and
assigning a name correlation score based on how many of the one or more selected components are in common between the input listings in the pair.

16. The method of claim 14, wherein performing a numbers_in_the_name correlation test between input listings of the group of input listings comprises:
pairing input listings from the group of input listings such that each input listing is paired with every other input listing in the group to form pairs of input listings;
splitting the name value for each input listing in a pair of input listings into components, wherein each component includes an alpha-numeric word;
selecting components that contain one or more numerals for each input listing in the pair of input listings to be one or more selected components; and
assigning a numbers_in_the_name correlation score based on how many of the one or more selected components are in common between the input listings in the pair of input listings.

17. The method of claim 14, wherein performing a category correlation test between input listings of the group of input listings comprises:
pairing input listings from the group of input listings such that each input listing is paired with every other input listing in the group of input listings to form pairs of input listings, wherein the input listing includes one or more levels of sub-categories; and
comparing each level of a category value in one input listing of a pair of input listings with a corresponding level of the category value in a remaining input listing in the pair of input listings.

18. The method of claim 14, wherein a category correlation test comprises one of a strict category correlation test or a relaxed category correlation test.

19. The method of claim 14, wherein performing a price correlation test between input listings of the group of input listings comprises:
   pairing input listings from the group of input listings such that each input listing is paired with every other input listing in the group of input listings to form pairs of input listings; and
   comparing a price value in one input listing in a pair of input listings with a corresponding price value in a remaining input listing in the pair of input listings.

20. The method of claim 14, wherein a price correlation test comprises one of a strict price correlation test or a relaxed price correlation test.

21. The method of claim 14, wherein performing a brand correlation test between input listings of the group of input listings comprises:
   pairing input listings from the group of input listings such that each input listing is paired with every other input listing in the group of input listings to form pairs of input listings; and
   comparing the brand values in a pair of input listings.

22. The method of claim 14, wherein performing a model correlation test between input listings of the group of input listings comprises:
   pairing input listings from the group input listings such that each input listing is paired with every other input listing in the group of input listings to form pairs of input listings; and
   comparing model values in a pair of input listings.

23. A system for mapping input listings to consolidated listings, the system comprising a computer processor configured to:
   receive a plurality of input listings from one or more sources, wherein the plurality of input listings comprise different item listing variants for a particular product;
   establish, from the plurality of input listings, a group of input listings that share one or more common attribute values representing the particular product;
   determine, for the group of input listings, a single corresponding consolidated listing that represents the particular product based on attribute values associated with the input listings in the group of input listings and attribute values associated with consolidated listings;
   map each input listing in the group of input listings to the determined consolidated listing; and
   display the consolidated listing rather than the different item listings variants representing the particular product.

24. A computer-implemented method of processing a search query against at least one database, wherein the at least one database includes one or more different item listing variants for a particular product and mapping information that maps each of the one or more item listing variants to a single corresponding consolidated listing that represents the particular product, the method comprising:
   receiving, from a client device associated with a user, a search query that specifies an item listing variant for a particular product;
   determining via a computer processor, based on the mapping information stored in the at least one database, the corresponding consolidated listing mapped to the specified item listing variant;
   transmitting to the client device, in response to the search query, the determined consolidated listing for the particular product as a search result; and
   transmitting to the client device, in response to a user request, all the different item listing variants mapped to the determined consolidated listing.

* * * * *